June 28, 1932.  J. R. REYBURN  1,865,275
PROCESS AND APPARATUS FOR REENFORCING CROSS CHAINS AND THE LIKE
Filed Oct. 22, 1926  5 Sheets-Sheet 1
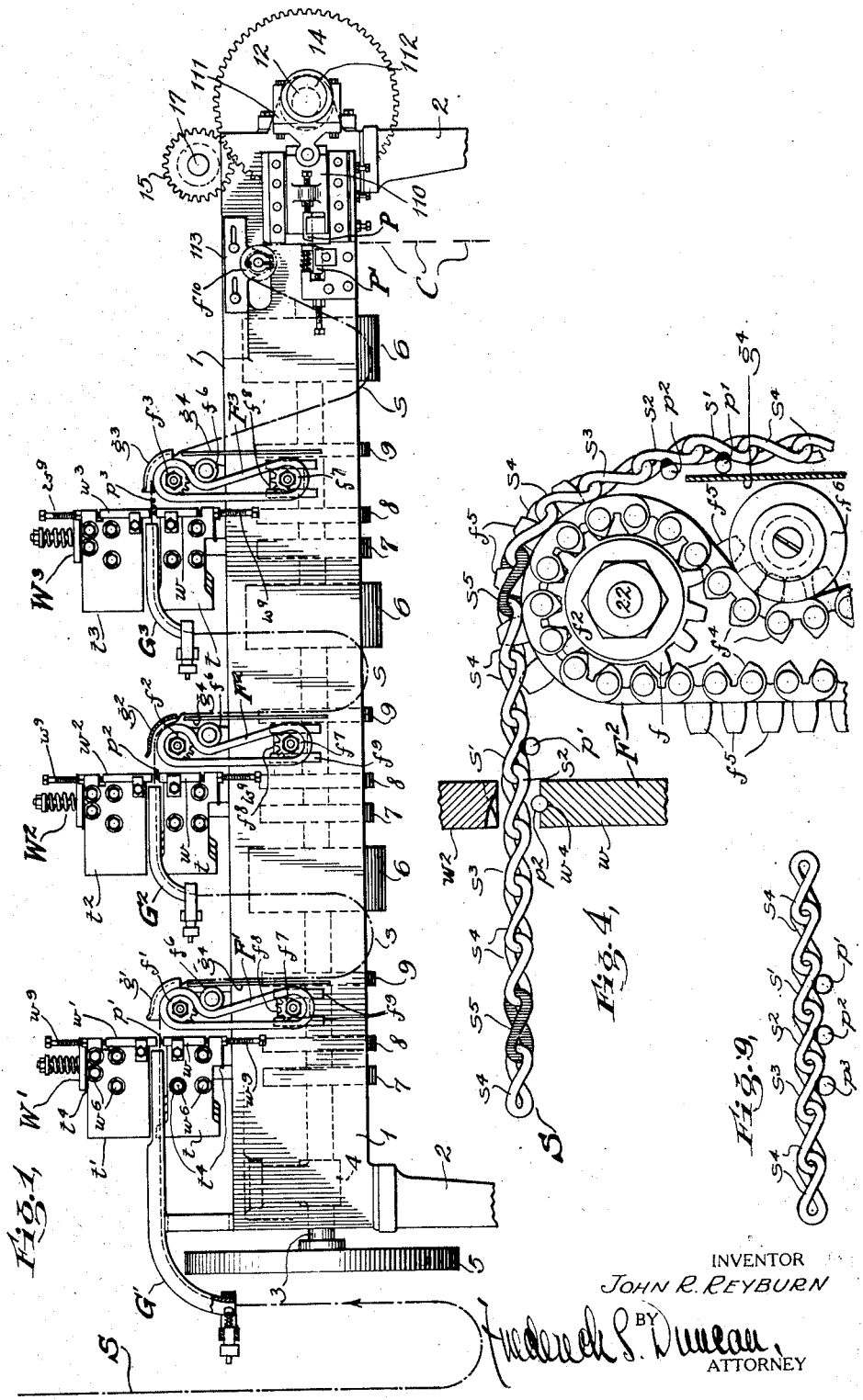
INVENTOR
JOHN R. REYBURN
BY
ATTORNEY

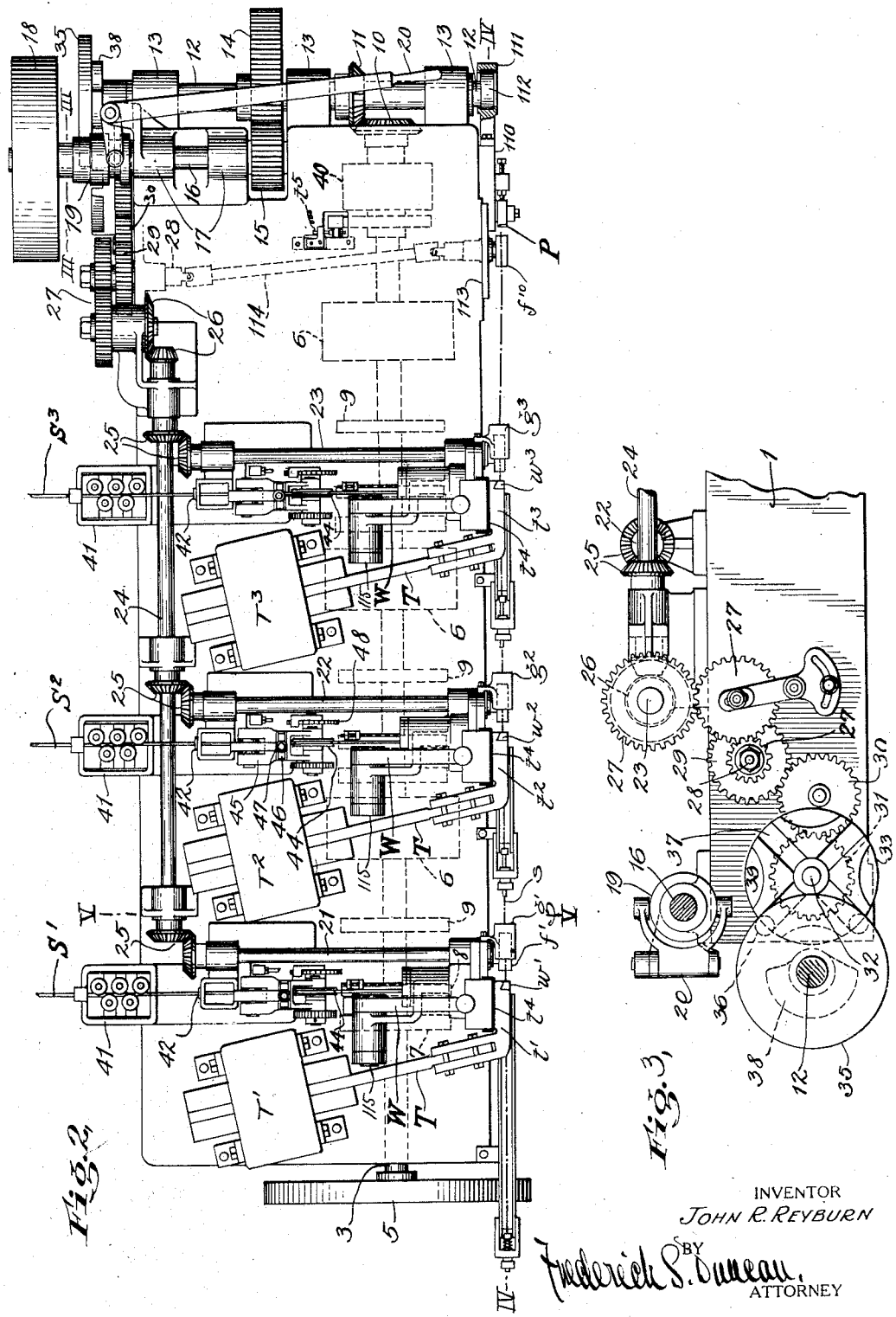

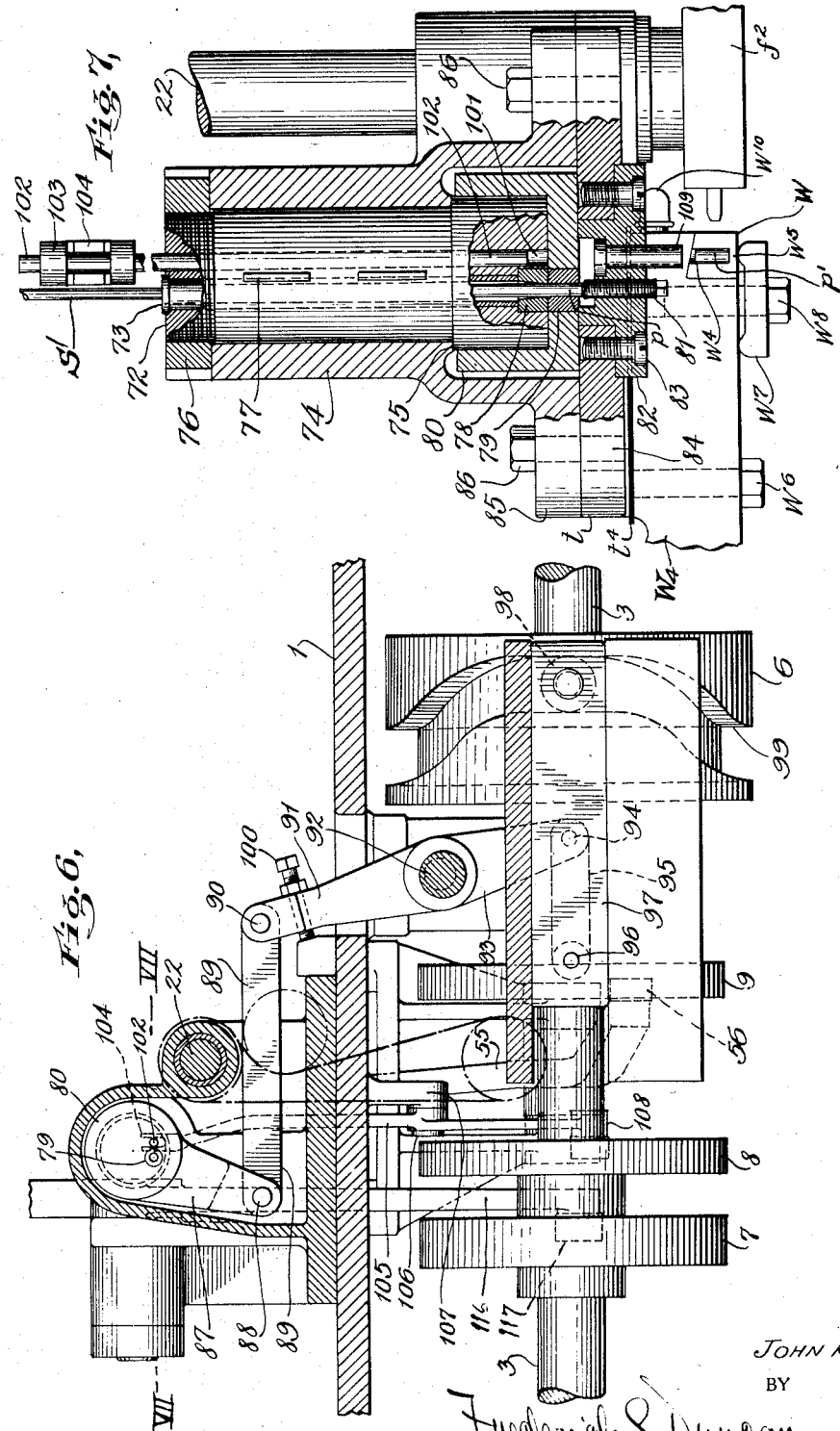

June 28, 1932.  J. R. REYBURN  1,865,275
PROCESS AND APPARATUS FOR REENFORCING CROSS CHAINS AND THE LIKE
Filed Oct. 22, 1926  5 Sheets-Sheet 5

INVENTOR
JOHN R. REYBURN
BY
ATTORNEY

Patented June 28, 1932                                                                   1,865,275

UNITED STATES PATENT OFFICE

JOHN R. REYBURN, OF FAIRFIELD, CONNECTICUT, ASSIGNOR TO AMERICAN CHAIN
COMPANY, INC., A CORPORATION OF NEW YORK

PROCESS AND APPARATUS FOR REENFORCING CROSS-CHAINS AND THE LIKE

Application filed October 22, 1926. Serial No. 143,412.

This invention relates to the reinforcement of such articles as chains, and has for its primary object an improved process for welding bars to the cross chains of non-skid devices for vehicle wheel tires, for the purpose of constituting such cross chains effective non-skid devices, although the use of this invention is contemplated in any field for which the improvements are adapted by their nature, and various features thereof may be employed advantageously in securing objects together otherwise than by welding.

Another object of the invention is to provide a reinforcement process of which the several steps may be carried on continuously in a series of repeated operations, automatically, with a minimum of attention by an operator, and at relatively low expense, using stock such as chain and wire in the form of a continuous supply, the process preferably comprising as one step the operation of dividing the wire stock into suitable parts for attachment, and the further steps of attaching the parts and of parting the completed product into sections ready for embodiment as cross chains or equivalent devices, in the conventional non-skid tire chains at present on the market, or in whatever similar embodiment the product may be utilized to advantage.

Another object of the invention is to provide an organized machine for carrying the above process into effect, this machine embodying various improved devices which may be utilized generally in apparatus for performing welding operations, the machine also embodying certain devices which may be utilized for performing operations other than those operations required for making the cross chains to which reference has already been made.

A further object of the invention is to provide such a machine with a plurality of welding or reenforcing units organized to operate concurrently, so that the cycles of such concurrent operations are performed in synchronism, and each results in the production of a complete segregable cross-chain or similar product, the operations being performed simultaneously upon a series of the groups of links adapted to form the cross chains or other articles to be produced.

More particularly, an object of the invention is to provide for feeding wire from a continuous supply such as a series of supply coils or drifts of the wire into position for dividing the same into parts of proper size for attachment to portions of chain which may be used thereafter for cross chains; and provision for feeding a continuous supply of chain into a position, or postions, at which the above-mentioned reinforcement parts may be conveniently welded to the appropriate regions of the chain; and also to provide for concurrently dividing the chain, thus reinforced, into sections of chain suitable for use as cross chains-without the necessity for further manipulation.

These and other objects of the invention are illustrated and described fully in the accompanying drawings and specification and are set forth in the claims.

In the drawings,

Fig. 1 is a view in front elevation of an organized welding machine in the construction of which the invention has been embodied, and which is adapted for carrying the improved process into effect.

Fig. 2 is a plan view of the same.

Fig. 3 is a fragmentary detail view in vertical section on the line III—III of Fig. 2.

Fig. 4 is a fragmentary detail view, on a larger scale, in vertical section on the line IV—IV of Fig. 2, parts being omitted for the sake of clearness in illustration.

Fig. 6 is a similar view on the line VI—VI of Fig. 5.

Fig. 7 is a fragmentary detail view in horizontal section upon an enlarged scale, taken on the line VII—VII of Fig. 6.

Fig. 9 is a detail view of a complete cross-chain with its reenforcing bars.

Figure 5:
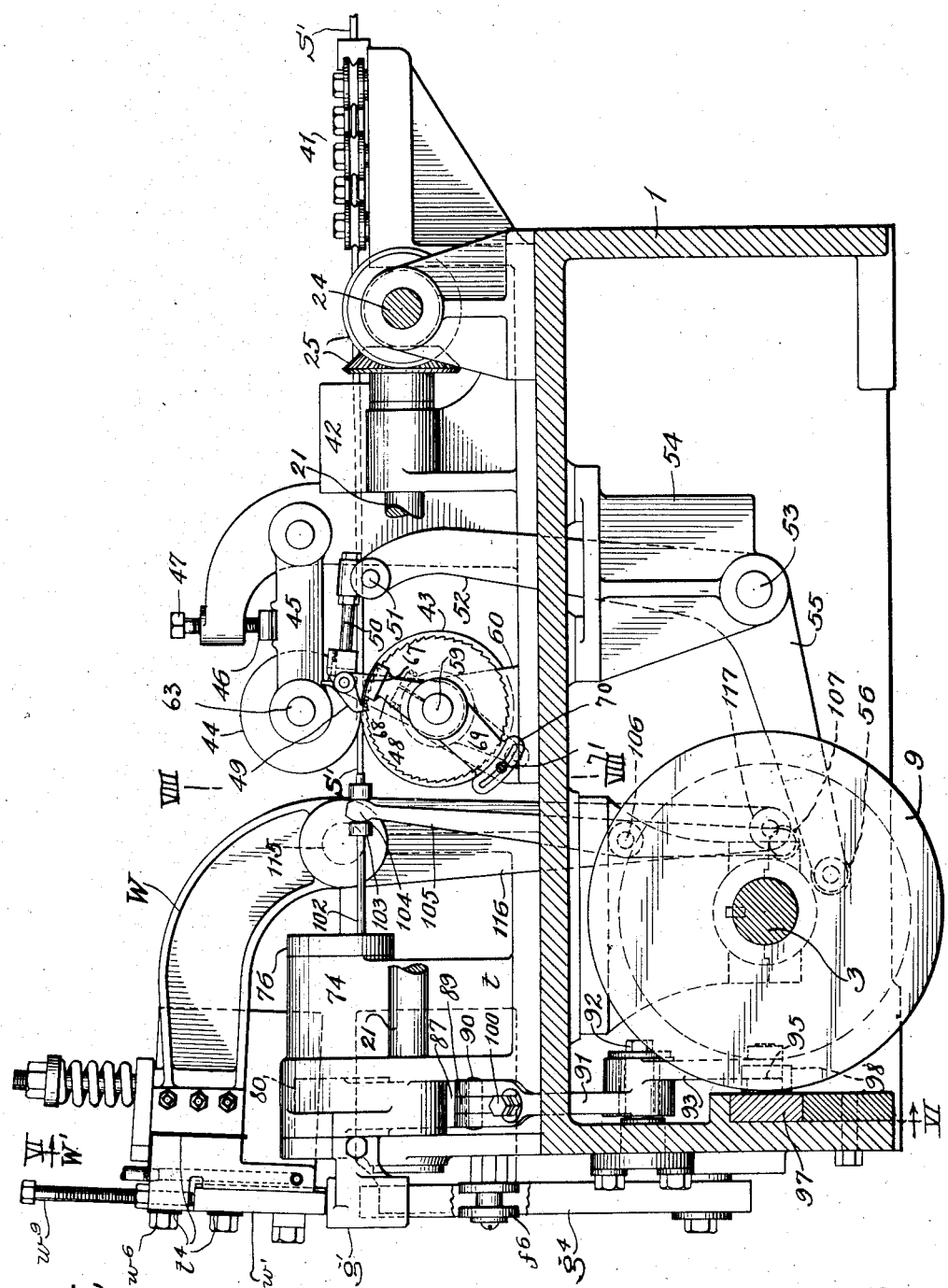
Fig. 5 is a fragmentary detail view in vertical section, upon an enlarged scale, taken on the line V—V of Fig. 2.

Referring to the drawings, illustrative of a now preferred embodiment of the invention, and a suitable machine for carrying the improved process into effect, the various steps of the process will first be described briefly as they may be conveniently performed in accomplishing reenforcement of a continuous supply of chain, and thereafter dividing the same into sections suitable for embodiment as cross chains in making non-skid tire chains for automobiles.

The machine illustrated is particularly adapted for welding such reenforcements to the chain, and the part designated by the reference numeral 1 is a table or base, supported on suitable standards 2 and having a driving shaft 3 mounted in bearings 4 carried by the table, this shaft being preferably provided with a flywheel 5 and serving to actuate the various instrumentalities of the machine, including cams 6, 7, 8 and 9, of which there are three series, each series serving to actuate the operating parts connected with one of the welding units $W^1$, $W^2$, and $W^3$.

A supply of chain, indicated diagrammatically in Fig. 1 by a dash and dot line, and designated by the reference character S, may be derived from any suitable source of such supply, being led through guides $G^1$, $G^2$ and $G^3$ from the supply to the unit $W^1$, thence to the unit $W^2$ and thence to unit $W^3$. These units are operated concurrently and each serves in the instance illustrated to apply one reenforcement bar to the chain at each welding operation, the bars being applied to successive links of the chain, so that when any given portion of the chain has traversed three of the units there will be three bars attached to each group of links comprising three adjoining links of the chain, (see Fig. 9) in the instance selected for illustration, it being understood that the attachment of any desired number of bars or other reenforcements may be provided for.

The bars may be derived from any suitable supply. Preferably the machine is provided with suitable means, indicated at 44 in Fig. 2 for feeding several wires $S^1$, $S^2$ and $S^3$, through mechanism which will be hereinafter described, which forms the bars and delivers them to the units $W^1$, $W^2$ and $W^3$.

These bars are indicated in Figs. 1 and 9 by the reference characters $p^1$, $p^2$, and $p^3$ respectively, the first of which, $p^1$, is applied by the welding unit $W^1$, the second, $p^2$, is applied by the welding unit $W^2$ and the third, $p^3$, is applied by the welding unit $W^3$, as shown in the drawings.

Suitable means are provided for feeding the chain S from one unit to the next, so that, regardless of minor variations in the chain, the successive bars will be secured thereto in their appropriate positions, and the now preferred form of these means will be described more in detail at a later stage of this specification. At present it is sufficient to state that after leaving the unit $W^1$, where the bar $p^1$ has been applied to a link $s^1$, (see Fig. 1) by means of suitable welding tools, $w$, $w^1$ the chain passes to a feeding sprocket chain $F^1$ which serves to advance the chain positively toward the welding unit $W^2$, the intermediate part of the chain hanging in a loop $s$ between the units; thence, the chain is drawn positively through the welding unit $W^2$ by means of a sprocket chain $F^2$, as indicated in Fig. 4, into the position shown in Figs. 1 and 4, at which the welding tools $w$, $w^2$, operate to attach the bar $p^2$, there being a dwell in the feeding movement of the chain during the welding operations; then the chain, with its portion between the welding units $W^2$ and $W^3$ hanging in another loop $s$, is drawn through the welding unit $W^3$ by a sprocket chain $F^3$, similar in every respect to that shown at $F^2$ in Fig. 4, into position to receive the bar $p^3$, so that the part of the chain designed for use as a cross chain is now reenforced by three bars, as shown in Fig. 9.

It will be noted that in addition to the three adjoining links $s^1$, $s^2$ and $s^3$ provided with the reenforcing bars $p^1$, $p^2$ and $p^3$, the section of chain shown in Fig. 9 has also, on each side of the reenforced bars, a couple of additional links respectively bearing the reference characters $s^4$, and those familiar with the art will understand that these additional links are used to connect the cross chain with the side chains by which the cross chains are assembled to form a non-skid tire chain, only those links being reenforced which are required to furnish the necessary non-skid contacts with the road surface.

The shaft 3 may be driven by any suitable means and is shown (see Fig. 2) as connected by bevel gears 10 and 11 with a countershaft 12 mounted in bearings 13 on the table 1 and geared at 14 and 15 to a main driving shaft 16 mounted in bearings 17 and having a belt-pulley 18, and a clutch 19 controlled by a shipping lever 20.

It is to be understood further that the loop portions $s$, which are only indicated in dash and dot lines in Fig. 1, are respectively provided with bars at intervals, the portion between the units $W^1$ and $W^2$ having been provided with the first bar $p^1$ of each group of the series, to which the unit $W^2$ adds the second bar $p^2$ of each group of the series, so that the chain part forming a loop $s$ between the units $W^2$ and $W^3$ has two of the bars of each group in the series; and after the chain has left the unit $W^3$ there are all three bars in each group of the series in the final loop $s$ intervening between the head $W^3$ and the cutting mechanism P, $P^1$, where the chain is severed to form sections of cross chain, indicated in Fig. 1 by the reference character C.

Each of these sections constitutes a cross-chain like that shown in Fig. 9, having bars $p^1$, $p^2$, $p^3$, upon the middle three links $s^1$, $s^2$ and $s^3$ respectively, and each such section of cross chain preferably has two links $s^4$ at each end as already described, the operation of severing having been performed by the removal of intervening links $s^5$ which are cut out by the action of the shear members P, P¹.

For the sake of clearness in illustration, the links $s^5$ are hatched in Fig. 4, but need not be of different structure from the rest of the links in the chain, the latter being preferably a chain of conventional form, or of any form suitable for the purpose.

Having thus indicated the principal steps of the process, the preferred form of apparatus illustrated will now be described more particularly, together with the operations performed by each of the instrumentalities of the machine in carrying the process into effect.

Each of the welding units W¹, W² and W³ preferably comprises a stationary lower member $t$ mounted upon the table 1, and each unit comprises also a reciprocating head, these heads being designated by the reference characters $t^1$, $t^2$, and $t^3$ and being mounted on arms W arranged respectively to rock upon horizontal pivots 115 carried by the stationary members $t$ respectively (see Fig. 5).

Each of the members $t$ is furnished with a suitable welding tool $w$ having a socket or recess at $w^4$ to receive successive bar parts $p^1$, $p^2$, or $p^3$, according to the unit in which the tool is embodied and which serves to present the bar in position for engagement with the supply of chain S as the same is led through the welding units successively (see Fig. 4). In pursuance of an important object of the invention, the chain S is preferably passed above these bar parts in substantially the relative position shown in Fig. 4, and welding engagement is effected by depressing co-operating welding tools $w^1$, $w^2$, $w^3$ respectively for each welding operation, so that after the welding operation, as the chain S is fed forward, it picks up the bars which have been welded thereto and carries them forward, as indicated at $p^1$ in Fig. 4.

In order that the successive links $s^1$, $s^2$ and $s^3$ of each group in the series may be positioned properly, each to receive successively its appropriate bar $p^1$, $p^2$ or $p^3$, provision is made for co-ordinating the movements of the chain with the welding movements of the welding heads $t^1$, $t^2$ and $t^3$ and their tools $w^1$, $w^2$ and $w^3$. Any form of mechanism suitable for this purpose may be employed, but it is preferred to utilize mechanism of a type which has been devised specially for this purpose.

Enough of this mechanism is illustrated in detail in Figs. 1 to 4 to permit a ready understanding of its mode of operation, Fig. 4 showing in vertical sectional detail upon an enlarged scale the feeding mechanism F², it being understood that the feeding mechanisms F¹ and F³ are preferably identical therewith. Briefly described, the feeding mechanism comprises a sprocket chain F² adapted to be fed by a sprocket wheel $f^2$ mounted upon a cross-shaft 22 which is actuated by a driveshaft 24 through the medium of bevel gears 25 (see Fig. 2), this shaft 24 serving to actuate similar cross shafts 21 and 23, carrying the sprocket wheels $f^1$ and $f^3$ respectively, and deriving its own movement through bevel gears 26 from a series of change speed gears 27, the latter being driven by a shaft 28 having a gear 29 meshing with an intermediate gear 30 which in turn is driven by a gear 31 upon the shaft 32 of co-operating Geneva disks 33 and 35. (See Fig. 3). The disk 35 is mounted upon, and actuated by, the counter shaft 12 and has projections 36 which work in radial slots 37 upon the disk 33, and the disk 35 has also a cam projection 38 which work in corresponding arcuate portions 39 of the Geneva disk 33, this double arrangement providing for the desired intermittent operation of the sprocket chains F¹, F² and F³, in order to permit a dwell of the chain S for each welding operation, it being understood that each of these sprocket chains is controlled by one of the sprocket wheels $f^1$, $f^2$, $f^3$, the latter having teeth $f$ which co-operate with links $f^4$ upon the sprocket chains, and the sprocket chains having teeth $f^5$ suitable for entering the links $s^4$—$s^5$ of each group in the chain S, as shown in Fig. 4.

As the chain S is fed forward after receiving the bar reinforements, it passes through pivoted guides $g^1$, $g^2$, $g^3$, which serve respectively to maintain engagement of the chain S with the teeth of the sprocket wheels, until the feeding movement has been completed, and then the reinforced chain is stripped from the sprocket wheels by suitable guide plates $g^4$ and hangs freely in the respective loops $s$, the sprocket chains preferably passing behind idler pulleys $f^6$ which aid to accomplish the stripping action, and the sprocket chains thereafter pass around idler sprocket wheels $f^7$ mounted on blocks $f^8$ held in guideways $f^9$ carried by the front of the table 1.

The last of the loops $s$ shown near the right-hand side of Fig. 1 leads to a sprocket wheel $f^{10}$ which is actuated by a shaft 114 shown in Fig. 2 in dotted lines as connected with the shaft 28 already described, so that the rotation of the sprocket wheel $f^{10}$ is co-ordinated with that of the sprocket wheels $f^1$, $f^2$, $f^3$, in order to insure proper positioning of the reinforced chain for severance by the parting shears P, P¹, the latter operating upon the links $s^5$ successively as already described.

Bar supply mechanism

The bar reinforcement parts $p^1$, $p^2$, $p^3$ may be supplied to the welding tools by any suitable mechanism, and description will now be made of a preferred form of mechanism which has been devised to permit the concurrent formation of the bar parts from continuous supplies of wire, which may take the form of lengths $S^1$, $S^2$, $S^3$, as indicated in Fig. 2, derived from reels or swifts of wire (not shown).

After passing through suitable straightening means 41 and guides 42, each of the wires $S^1$, $S^2$, $S^3$ is run between a pair of grooved pulleys 43 and 44 (see Fig. 5) there being three sets of these pulleys, or one for each of the supply wires, it being understood that any desired number of such wires may be provided for.

Figure 8:
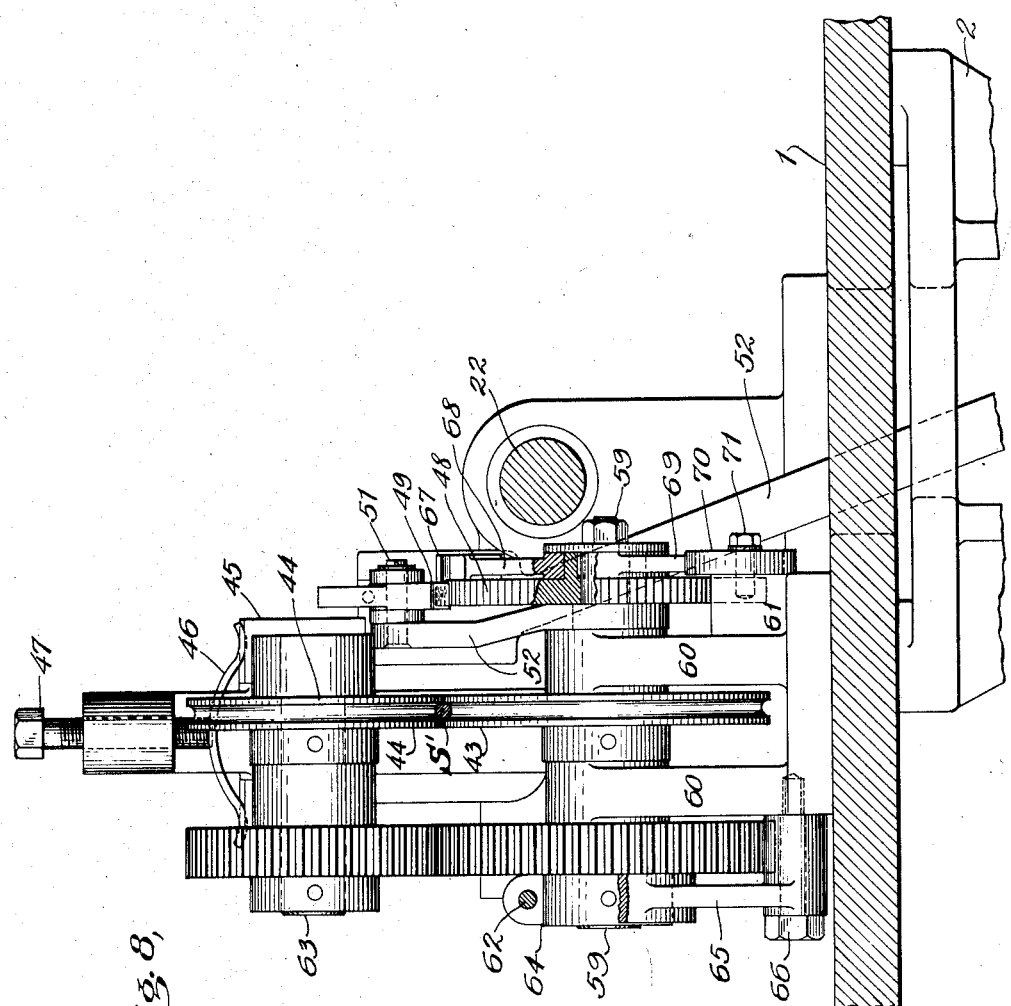
Fig. 8 is a fragmentary detail view in vertical section, upon an enlarged scale, taken on the line VIII—VIII of Fig. 5.

One of these sets of rolls is shown in side elevation in Fig. 5 and is shown upon a still larger scale in Fig. 8. The upper roll 44 is carried by a yoke 45 pressed downward yieldingly by a spring 46, the tension of which may be regulated by a set screw 47, and each of the rolls 44 constitutes a driven roll.

Each of the rolls 43 serves as a driving or feed roll, being actuated for that purpose by a ratchet wheel 48 operated by a pawl 49 carried by a member 50 mounted pivotally at 51 upon a bell-crank lever 52 which oscillates upon pivot bearings 53 carried by a bracket 54 beneath the table 1 and has its arm 55 furnished with a roller 56 which engages with a suitable cam groove in one of the cams 9 mounted on the shaft 3 (see Fig. 6).

When the pawl 49 is driven forward, it engages with one of the teeth of the ratchet wheel 48 and turns the same counter-clockwise, feeding forward the wire $S^1$ a distance which may be regulated by suitable mechanism designed to cause engagement of the pawl 49 with one or more of the teeth of ratchet 48. For this purpose a shield 67 is provided, carried by an arm 68 mounted upon the hub of the ratchet wheel, and having at 69 an extension furnished with a slotted member 70 which may be bolted adjustably at 71 to the portion 61 of the bearing brackets 60, as shown in Fig. 8, this shield 67 serving to lift the pawl 49 on its rearward movement, so that in accordance with the position of the shield 67, the pawl is permitted to engage the desired number of teeth of the ratchet 48.

The shafts 59 and 63 of the rolls 43 and 44 are geared together, as shown, and a friction device is provided at 64 acting upon the shaft 59 and being secured by an arm 65 bolted at 66 to the bearing brackets 60, the friction device having an adjusting screw 62, this friction device serving to permit a desirable slip of the feeding rolls upon the shaft, in order to avoid back-lash of the rolls by reason of the tension of the wire $S^1$.

Bar-parting mechanism

An important object of the invention is to provide for automatic severance of the supply of wire into parts for attachment, and the preferred form of mechanism which has been devised especially for this purpose is illustrated in enlarged detail in Figs. 6 and 7, showing parts of one unit $W^1$.

Each of the wires $S^1$, $S^2$ and $S^3$ is delivered by its feeding rolls 43 and 44 to a cutter-head 72 (see Fig. 7) having a longitudinal bore fitted with a sleeve 73, through which the wire is fed, this cutter-head being mounted in fixed position within a boss 74 against which a shoulder 75 upon the cutter is drawn firmly by a collar 76 upon the outer end of the head 72. Rotation of the head 72 may be further prevented by splines 77. At the forward, or working, end of the cutter-head 72 is provided a shear-member 78 adapted to cooperate with a shear-member 79 mounted in a rotatable cutting member 80 surrounding the forward portion of the cutter-head 72, these shear members 78 and 79 serving when the member 80 is rotated to cut off a part of the wire, such as that indicated at $p$ in Fig. 7, of a size suitable for the desired attachment, and the length of which may be determined conveniently by regulation of an abutment 81 screwed adjustably into a plate 82 bolted at 83 to the head $t$.

Any suitable means may be provided for actuating the member 80 rotatably, and in Fig. 6 such means are illustrated as taking the form of an arm 87 connected pivotally at 88 with a link 89 which is connected pivotally at 90 with a lever 91 mounted upon a rock-shaft 92 and having an arm 93 which is pivoted at 94 to a link 95 that derives its actuation from pivot connections 96 with slide 97, the latter being actuated by a roller 98 working in a groove 99 of one of the cams 6.

The range of movement of the lever 91 and its associated parts may be controlled by adjustment of the screw 100 shown in Fig. 6, and such adjustment provides for presenting the part $p$ in suitable position for delivery to the welding tools $w$, $w^1$, this delivery being effected as a continuous part of the cutting movement. As the member 80 is rotated for the cutting operation the shear part 79, carrying the part $p$, is brought opposite the mouth of a bore 101 in the head 72 within which bore works a plunger 102 which may be driven forward to eject the part $p$; and for the purpose of operating the plunger 102 at appropriate intervals a head 103 is shown, mounted adjustably upon the plunger 102 and connected by a fork 104 to a lever 105 arranged to rock upon a pivot 106 carried by a bracket 107 below the table 1, the lever 105 having an extension provided with a roll 108 adapted to be operated by one of the cams 8 on the shaft 3.

When the bore of die 79 has brought the part $p$ opposite the bushing 109 carried by the plate 82, the plunger is moved forward and forces the part through the bushing 109 into position above the lower welding tool $w$ (see Fig. 7), where it is free to drop into the socket $w^4$, after engaging the forward shoulder $w^5$ of the welding tool, and the part then constitutes one of the bars $p^1$ ready for the welding operation.

The cutter member 80 is then rotated in reverse direction into position in which its shear member 79 receives an additional supply of stock and this operation of shearing off the parts and transferring them into position for welding is repeated during the operation of the machine.

Welding operation

The operations already described are of a preparatory character, leading up to the final operation of attaching the parts $p^1$, $p^2$, $p^3$ to the chain S, and it is to be understood that these preparatory operations, while described particularly as forming steps in a process which is especially useful for welding reinforcements to cross chains of nonskid tire chains, are not limited in their utility, either collectively or severally, to utilization in a welding operation, but may be used so far as practicable in connection with other attachment operations, and when used for welding purposes may be used to weld together articles other than bars and chains.

When it is desired to perform welding operations, any suitable welding apparatus may be provided, and as a convenient form of welding appliance, the machine is shown as furnished (see Fig. 2) with transformers $T^1$, $T^2$ and $T^3$, which may be of any well-known or suitable structure, and do not require specific description, these transformers being connected by conductors T with the welding heads $t^1$, $t^2$, $t^3$ and wherever required, suitable insulation may be provided as indicated at $t^4$.

The shaft 3 may be provided with a suitable commutator 4 arranged to make and break the transformer circuits through electrical connections $t^5$, which need not be shown in detail.

The welding tools $w$ are illustrated as held respectively by chills $W^4$ (see Fig. 7) being bolted at $w^6$ to the heads $t$ respectively, a clamp $w^7$ secured by bolts $w^8$ being provided to maintain the welding tool removably in adjusted position. The tools $w^1$, $w^2$ and $w^3$ may be similarly mounted, and are preferably furnished with adjusting bolts $w^9$, (see Fig. 1). In Fig. 7 at $w^{10}$ pipe connections are shown for furnishing chilled fluid to the chills $W^4$.

Mechanism for depressing the welding heads

As already described, each of the welding heads $W^1$, $W^2$, and $W^3$ is carried preferably by an arm W mounted pivotally at 115 upon the stationary portion $t$ of the respective heads, these arms each having an extension 116 provided with a cam roller 117 adapted to be actuated by one of the cams 7, so that the welding contacts are effected by movements of the arms W in co-ordinated relation with the other movements of the machine, occurring during appropriate dwells in the movement of the chain S, and it is to be understood that the welding movement of the heads $W^1$, $W^2$ and $W^3$ are approximately simultaneous, so that three bars are applied at each such movement, and accordingly each welding operation results in the completion of a cross chain, at the third welding head $W^3$, although the welding operations are performed successively for the three different positions of the respective bars upon any given cross chain. Likewise the severance of a complete cross chain is accomplished at the time of the dwell for welding purposes.

Severing mechanism

Where it is desired to complete the formation of cross chains by severing the chain S, after reinforcement as hereinbefore described at intervals by the respective series of bars, suitable mechanism is provided for accomplishing the severance, and the drawings illustrate for that purpose a pair of shears P, $P^1$ of which the former is mounted upon a slide 110 actuated by an eccentric strap 111 operated by an eccentric 112 upon the shaft 12, the reciprocating movement of this shear member P cutting the chain off by severing the links $s^5$, resulting in the delivery of completed cross chains, indicated diagrammatically at C in Fig. 1 and shown in detail in Fig. 9. The cross chains are then ready for assembly with suitable side chains to form complete nonskid tire chains.

I claim:—

1. In the process of applying reinforcements to chain, the steps which comprise feeding reinforcement parts transversely to the chain, and securing said parts respectively to the chain in multiple approximately simultaneously.

2. In the process of applying reinforcements to chain, the steps which comprise feeding reinforcement parts transversely to the chain, in multiple and welding said parts approximately simultaneously to widely separated links of the chain.

3. In the process of applying reinforcements to chain of the type having twisted links, the steps which comprise feeding reinforcement parts transversely to the chain, and welding said parts respectively to the chain in multiple approximately simultaneously.

4. In the process of applying reinforcements to chain, the steps which comprise feeding an extended supply of chain lengthwise, feeding an extended supply of reinforcement stock in multiple transversely to the chain, during said feeding separating the reinforcement stock into parts and securing said parts respectively to the chain, approximately simultaneously then dividing the chain thus reinforced into sections, as part of a unitary operation.

5. In the process of applying reinforcements to chain, the steps which comprise feeding an extended supply of chain lengthwise, feeding an extended supply of reinforcement stock in multiple transversely to the chain, during said feeding separating the reinforcement stock into parts and securing successive series of said parts respectively to the chain, the parts composing each series being secured approximately simultaneously to widely separated links, and parts from several series constituting localized sets upon groups of neighboring links, then dividing the chain thus reinforced into sections of suitable size for utilization as cross-chains for anti-skid chains, each section comprising a group of links with its set of reinforcement parts.

6. In the process of applying parts to an extended articulated structure, the steps which comprise feeding said articulated structure lengthwise, feeding an attachment part into proximity to the path of said articulated structure below, depressing a portion of said articulated structure out of its path into contact with said part, welding said part thereto, and restoring said articulated structure to its normal path, thereby picking up said attached part, and feeding said articulated structure lengthwise in its normal path with said part attached, feeding another part into proximity to said articulated structure at an advanced position, moving the portion of said articulated structure bearing said already attached part out of its normal path into contact with said other part, attaching the latter part to said article in proximity to the part already attached, repeating said feeding and transverse attaching movements until each portion of said articulated structure is provided with the desired number of parts.

7. In the process of applying parts to an extended articulated structure, the steps which comprise feeding said articulated structure lengthwise between welding devices, feeding an attachment part into proximity to the path of said article to one of said welding devices whereby said part is supported below said article, depressing a portion of said article out of its path into contact with said part, attaching said part thereto, and restoring said article to its normal path, thereby picking up said attached part, and feeding said article lengthwise in its normal path with said part attached, feeding another part into proximity to said article and supporting said other part by said welding device at an advanced position, moving the portion of said article bearing said already attached part out of its normal path into contact with said other part, attaching the latter part to said article in proximity to the part already attached, repeating said feeding and transverse attaching movements until each portion of said article is provided with the desired number of parts and then removing successively from said article each such portion with its attached parts.

8. In the process of applying parts to an extended chain, the steps which comprise feeding said chain lengthwise, feeding an attachment part into proximity to the path of said chain, moving a portion of said chain out of its path into contact with said part, and welding said part thereto, and feeding said chain lengthwise in its normal path, with said part attached, feeding another part into proximity to said chain at an advanced position, moving the portion of said chain bearing an already attached part out of its normal path into contact with said other part, welding the latter part to said chain in proximity to the part already attached, and repeating said feeding and welding operations until each portion of said chain is provided with the desired number of parts.

9. In the process of applying parts to an extended chain, the steps which comprise feeding said chain lengthwise, feeding an attachment part into proximity to the path of said chain, moving a portion of said chain out of its path into contact with said part, and welding said part thereto, and feeding said chain lengthwise in its normal path, with said part attached, feeding another part into proximity to said chain at an advanced position, moving the portion of said chain bearing an already attached part out of its normal path into contact with said other part, welding the latter part to said chain in proximity to the part already attached, and repeating said feeding and welding operations until each portion of said chain is provided with the desired number of parts, and then removing successively from said chain each such portion with its attached parts.

10. In the process of applying parts to an extended flexible article, the steps which comprise feeding a plurality of said parts respectively to spaced portions of said article in a unitary operation, attaching said parts to said article and repeating said operation to apply other parts thereto in similarly spaced relation, maintaining in loop form the portion of said article between said successive regions of attachment, and feeding said article, including said loop portion, lengthwise in such a manner as to present said article for attachment of said parts to successively adjacent portions of said article at the respective regions of attachment.

11. In the process of applying parts to an extended flexible article, the steps which comprise feeding a plurality of said parts respectively to spaced portions of said article in a unitary operation, welding said parts to said article, and repeating said operations to weld other parts thereto in similarly spaced relation, thereby forming spaced groups of said parts.

12. In the process of applying parts to an extended flexible article, the steps which comprise feeding a plurality of said parts respectively to spaced portions of said article in a unitary operation, welding said parts to said article, and repeating said operations to weld other parts thereto in similarly spaced relation, maintaining in loop form the portion of said article between said successive regions of attachment, and feeding said article, including said loop portion, lengthwise in such a manner as to present said article for attachment of said parts to successively adjacent portions of said article at the respective regions of attachment.

13. In the process of applying parts to an extended chain, the steps which comprise feeding a plurality of said parts respectively to spaced portions of said chain in a unitary operation, welding said parts to said chain and repeating said operations to weld other parts thereto in similarly spaced relation.

14. In the process of applying parts to an extended flexible article, the steps which comprise feeding three or more of said parts simultaneously in multiple to spaced portions of said article, welding said parts thereto in a unitary operation, and repeating said operations to apply other parts thereto in similarly spaced relation, maintaining in loop form the portions of said article between said successive regions of attachment, and feeding said article, including said loop portions, lengthwise in such a manner as to present said article for attachment of said parts to successively adjacent portions of said article at the respective regions of attachment, thereby providing said article with spaced groups of parts each comprising three or more parts.

15. In a machine for applying reinforcements to chain, a plurality of reenforcing units, means to feed an extended supply of chain longitudinally to said units successively, and means to present selected groups of links in said chain for the concurrent action thereon of said units.

16. In a machine for applying reinforcements to chain, a plurality of reenforcing units, means to feed an extended supply of chain longitudinally to said units successively, and means to present selected groups of links in said chain for the concurrent action thereon of said units whereby one of said units serves to apply a reinforcement part to a given link in each group successively at each reenforcing operation, while another unit applies a reinforcement part to another link in predetermined order of another group and thereby the reinforcement of each group of links is completed by a unitary operation of said units.

17. In a machine for applying reinforcements to chain, a plurality of reenforcing heads, means to feed an extended supply of chain longitudinally to said heads successively, and means to present selected groups of links in said chain for the concurrent action thereon of said heads whereby one of said heads serves to apply a reinforcement part to a given link in each group successively at each reenforcing operation, while another head applies a reinforcement part to another link in predetermined order of another group and thereby the reinforcement of each group of links is completed by a unitary operation of said heads.

18. In a machine for welding reinforcements to chain, a plurality of welding devices, means to feed chain and attachment parts to said devices in succession, and means to present groups of links for the concurrent action thereon of said devices.

19. In a machine for welding reinforcements to chain, a plurality of welding devices, means to feed chain and attachment parts to said devices in succession, and means to present groups of links for the concurrent action thereon of said devices whereby one of of said devices serves to weld a reinforcement part to a given link in each group successively at each welding operation, while another of said devices welds a reinforcement part to another link in predetermined order of another group.

20. In a machine for welding reinforcements to chain, a plurality of welding devices, means to feed chain and attachment parts to said devices in succession, and means to present groups of links for the concurrent action thereon of said devices, whereby one of said devices serves to weld a reinforcement part to a given link in each group successively at each welding operation, while another of said devices welds a reinforcement part to another link in predetermined order of another group and thereby the reinforcement of each group of links is completed by a unitary operation of said devices.

21. In a machine for welding reinforcements to chain, a plurality of welding heads, means to feed an extended supply of chain longitudinally to said heads in succession, means to feed attachment parts to said heads, and means to present groups of links in said chain for the concurrent action thereon of said heads.

22. In a machine for welding reinforcements to chain, a plurality of welding heads, means to feed an extended supply of chain longitudinally to said heads in succession, means to feed attachment parts to said heads, and means to present selected groups of links in said chain for the concurrent action thereon of said heads, whereby one of said heads serves to weld a reinforcement part to a given link in each group successively at each welding operation, while another head welds a reinforcement part to another link in predetermined order of another group, and thereby the reinforcement of each group of links is completed by a unitary operation of said heads.

23. In a machine for welding reinforcements to chain, a plurality of welding heads, means to feed an extended supply of chain longitudinally to said heads in succession, means to feed a multiple supply of wire reinforcement stock to said heads, means to form said wire into reinforcement parts, and means to present said chain and parts for the concurrent welding action thereon of said heads.

24. In a machine for welding reinforcements to chain, a plurality of welding heads, means to feed an extended supply of chain longitudinally to said heads in succession, means to feed a multiple supply of wire reinforcement stock to said heads, means to form said wire into reinforcement parts, and means to present said chain and parts for the concurrent welding action thereon of said heads, whereby one of said heads serves to weld a reinforcement part to a given link in a selected group of links in said chain successively at each welding operation, while another head welds a reinforcement part to another link in predetermined order of another group, and thereby the reinforcement of each group of links is completed by a unitary operation of said heads.

25. In a machine for applying reinforcements to chain or the like, a plurality of reenforcing heads, means to feed an extended supply of chain longitudinally to said heads successively, including means to present a plurality of selected groups of links of said chain, in spaced relation, to said heads to receive attachments approximately simultaneously, said means being adapted to present all of the selected groups of links eventually to each head to receive an attachment from each head, and means to feed attachment parts to said heads.

26. In a machine for applying reinforcements to chain or the like, a plurality of reenforcing heads, means to feed an extended supply of chain longitudinally to said heads successively, including means to present a plurality of selected groups of links of said chain, in spaced relation, to said heads to receive attachments approximately simultaneously, said means being adapted to present all of the selected groups of links eventually to each head to receive an attachment from each head, and means to feed attachment parts to said heads, each head applying an attachment to one link of each group at each attaching operation, and means to coordinate the operation of said heads and said feeding means, whereby each head applies an attachment to a different link of each group, said attachments being applied by said heads respectively to each such link in the same order in each group, so that each group of links eventually receives a predetermined number of attachments corresponding to the number of heads.

27. In a machine for applying reinforcements to chain or the like, a plurality of welding heads, means to feed an extended supply of chain longitudinally to said heads successively, including means to present a plurality of selected groups of links of said chain, in spaced relation, to said heads to receive attachments approximately simultaneously, said means being adapted to present all of the selected groups of links eventually to each head to receive an attachment from each head, and means to feed attachment parts to said heads.

28. In a machine for applying reinforcements to chain or the like, a plurality of welding heads, means to feed an extended supply of chain longitudinally to said heads successively, including means to present a plurality of selected groups of links of said chain, in spaced relation, to said heads to receive attachments approximately simultaneously, said means being adapted to present all of the selected groups of links eventually to each head to receive an attachment from each head, and means to feed attachment parts to said heads, each head welding an attachment to one link of each group at each attaching operation, and means to coordinate the operation of said heads and said feeding means, whereby each head welds an attachment to a different link of each group, said attachments being welded by said heads respectively to said links in the same order in each group, so that each group of links eventually receives a predetermined number of attachments corresponding to the number of heads.

29. In a machine for welding reinforcements to chain, a series of reciprocating welding heads, and means to feed said chain lengthwise to said heads successively, means to feed attachment parts intermittently to said welding heads, current-controlling devices for said welding heads, and means to coordinate the lengthwise movements of said chain with the reciprocating movements of said heads, and with the intermittent operations of said part-feeding and current-controlling means.

30. In a machine for applying reinforcements at intervals to extended articles of the class described, a pair of electrodes adapted to co-operate for welding, one of said electrodes having a nest to receive and support successively the attachment parts, means to feed said parts successively to said supporting electrode, means to feed said extended article past said supporting electrode, and means to cause relative movement between said electrodes for successive welding operations.

31. In a machine for applying reinforcements at intervals to a chain, a pair of electrodes adapted to co-operate for welding, one of said electrodes having a nest to receive and support successively the attachment parts, means to feed said parts successively to said supporting electrode, means to feed said chain past said supporting electrode, and means to cause relative movement between said electrodes for successive welding operations.

32. In a machine for applying reinforcements at intervals to a chain, a pair of electrodes adapted to co-operate for welding, one of said electrodes having a nest to receive and support successively the attachment parts, means to feed said parts successively to said supporting electrode, means to feed and said chain past said supporting electrode, and means to cause relative movements of the other electrode to cause contact thereof with said chain and to move said chain into contact with said parts successively for successive welding operations.

33. In the process of welding parts to an extended chain, the steps which comprise feeding said chain lengthwise between a plurality of opposed electrodes, feeding an attachment part into electrical contact with one of said electrodes in proximity to the path of said chain and maintaining said electrical contact while causing relative movement between a free portion of said chain and at least one of said electrodes to effect welding engagement between said chain and said part and passing a welding current through said chain and part, thereby attaching said part thereto.

34. In the process of applying parts to an extended chain, the steps which comprise feeding said chain lengthwise between welding devices, feeding an attachment part into electrical contact with one of said welding devices in proximity to the path of said chain and supporting said part by said welding device, then moving a portion of said chain out of its path into welding engagement with said part and passing a welding current through said chain and part, thereby attaching said part thereto, then feeding said chain lengthwise in its normal path with said part attached, feeding another part to said welding device for attachment to said chain, moving the portion of said chain bearing said already attached part out of its normal path into contact with said other part, attaching the latter part to said chain in proximately to the part already attached, and repeating said feeding and transverse attaching movements until each portion of said chain is provided with the desired number of parts.

35. In the process of welding reenforcing parts to pre-selected links of a chain by means which include opposed welding electrodes, at least one of which is reciprocably mounted for welding movement and between which welding electrodes said preselected links may be successively positioned, the steps which comprise feeding a pre-selected link of the chain into the path of welding movement of the electrodes, feeding a reenforcing part that is to be welded to said link into electrical contact with one of said electrodes and directly into said path of said electrodes and into proximity with said link, and completing the welding operation.

36. In the process of welding reenforcing parts to pre-selected links of a chain by means which include opposed welding electrodes at least one of which is reciprocably mounted for welding movement and between which welding electrodes said pre-selected links may be successively positioned, the steps which comprise feeding a pre-selected link of the chain into the path of welding movement of the electrodes, causing the said link to dwell in said path for the welding operation, feeding a reenforcing part that is to be welded to said link into electrical contact with one of said electrodes and directly into said path of said electrodes and into proximity with said link, applying pressure as between said link and part by causing relative approaching movement of said electrodes sufficient to effect electrical welding contact between said link and part and compression of the weld, causing a welding current to pass from one electrode to the other through said part and said link, and repeating the operation described with succeeding links in the chain.

37. In the process of welding reenforcing parts to pre-selected portions of an extended article by means which include opposed welding electrodes at least one of which is reciprocably mounted for welding movement and between which welding electrodes said pre-selected portions of said article may be successively positioned, the steps which comprise feeding a pre-selected portion of said extended article to which said part is to be welded into the path of welding movement of the electrodes, causing the said pre-selected portion of said extended article to dwell in said path for the welding operation, feeding a reenforcing part that is to be welded to said article into electrical contact with one of the electrodes directly at a point in the said path of said electrodes and into proximity to said pre-selected portion of said article to which the said part is to be welded, applying pressure as between said article and part by causing relative approaching movement of said electrodes sufficient to effect electrical welding contact between said article and part and compression of the weld, causing a welding current to pass from one electrode to the other through the said part and said article, and repeating the operation described at succeeding pre-selected points of the article.

38. In a machine for welding reenforcing parts to pre-selected links of a chain, a plurality of opposed electrodes at least one of which is reciprocably mounted for welding movement, means to position said pre-selected links successively in the path of welding movement between said electrodes, means to feed a reenforcing part into electrical contact with one of said electrodes and directly into said path of said electrodes and into proximity with the pre-selected link to which said part is to be welded, and means to apply pressure as between each pre-selected link and its reinforcement part by causing relative approaching movement of said electrodes sufficient to effect electrical welding contact between said link and part and compression of the weld.

39. In a machine for welding reenforcing parts to pre-selected links of a chain, a plurality of opposed electrodes at least one of which is reciprocably mounted for welding movement, and at least one of which has an electrical contact portion having a contour to accommodate a reinforcement part and maintain it in position for welding to the link, means to position one of said pre-selected links in the path of welding movement between said electrodes, means to feed a reinforcement part into electrical contact with said contact portion of said last-mentioned electrode and directly into said path of said electrodes and into proximity with said link to which said part is to be welded, and means to apply pressure as between said link and part by causing relative approaching movement of said electrodes sufficient to effect electrical welding contact between said link and part and compression of the weld.

40. A machine for welding parts to an extended article comprising an upper electrode and a lower electrode provided with a recess in its contact face, means for feeding said article lengthwise between said electrodes, means for feeding an attachment part to said recess in electrical contact with the said lower electrode, and means for moving said upper welding electrode downwardly to depress the portion of the extended article to which the part is to be attached into welding engagement with the said part.

In testimony whereof, I have signed this specification.

JOHN R. REYBURN.